US012700645B2

(12) United States Patent　　　(10) Patent No.:　US 12,700,645 B2

Imoto et al.　　　　　　　　　　　(45) Date of Patent:　　　Aug. 4, 2026

---

(54) BATTERY AND METHOD FOR PRODUCING SAME

(71) Applicant: TeraWatt Technology K.K., Yokohama (JP)

(72) Inventors: Hiroshi Imoto, Yokohama (JP); Ken Ogata, Yokohama (JP)

(73) Assignee: TeraWatt Technology K.K., Yokohama (JP)

(*) Notice: Subject to any disclaimer, the term of this patent is extended or adjusted under 35 U.S.C. 154(b) by 641 days.

(21) Appl. No.: 18/071,312

(22) Filed: Nov. 29, 2022

(65) Prior Publication Data

US 2023/0100360 A1　　Mar. 30, 2023

Related U.S. Application Data

(63) Continuation of application No. PCT/JP2020/021599, filed on Jun. 1, 2020.

(51) Int. Cl.
| | |
|---|---|
| *H01M 50/451* | (2021.01) |
| *H01M 10/052* | (2010.01) |
| *H01M 10/058* | (2010.01) |
| *H01M 10/42* | (2006.01) |
| *H01M 50/417* | (2021.01) |
| *H01M 50/431* | (2021.01) |

(52) U.S. Cl.
CPC ....... *H01M 50/451* (2021.01); *H01M 10/052* (2013.01); *H01M 10/058* (2013.01); *H01M 10/4235* (2013.01); *H01M 50/417* (2021.01); *H01M 50/431* (2021.01)

(58) Field of Classification Search
CPC .......................... H01M 50/431; H01M 50/451
See application file for complete search history.

(56) References Cited

U.S. PATENT DOCUMENTS

| | | |
|---|---|---|
| 2011/0281167 A1 | 11/2011 | Sabi et al. |
| 2012/0295149 A1 | 11/2012 | Xie |

(Continued)

FOREIGN PATENT DOCUMENTS

| | | | |
|---|---|---|---|
| DE | 102013224294 A1 * | 5/2015 | .......... H01M 50/451 |
| JP | 2004-087402 A | 3/2004 | |

(Continued)

OTHER PUBLICATIONS

Addisu Alemayehu Assegie et al., "Multilayer-graphene-stabilized lithium deposition for anode-free lithium-metal batteries," Nanoscale, 2019, 11, pp. 2710-2720 (Year: 2019).*

(Continued)

*Primary Examiner* — Robert S Carrico
(74) *Attorney, Agent, or Firm* — Kilpatrick Townsend & Stockton LLP

(57) ABSTRACT

The present invention provides a battery that has excellent energy density and cycle characteristics early in the cycle. The battery in one aspect of the present invention comprises a positive electrode, a negative electrode that is free of a negative electrode active material, a separator that is disposed between the positive electrode and the negative electrode, and a conductive thin film that is disposed between the separator and the negative electrode. The thickness of the conductive thin film is 1 μm or less.

6 Claims, 2 Drawing Sheets

1

(56)  References Cited

U.S. PATENT DOCUMENTS

| | | | | |
|---|---|---|---|---|
| 2014/0329120 A1* | 11/2014 | Cui | ................... | H01M 50/449 |
| | | | | 429/90 |
| 2015/0171398 A1* | 6/2015 | Roumi | ............. | H01M 10/4257 |
| | | | | 324/426 |
| 2019/0260066 A1* | 8/2019 | Hu | ....................... | H01M 50/42 |
| 2020/0075990 A1 | 3/2020 | Park et al. | | |
| 2020/0176810 A1* | 6/2020 | Ogata | ................ | H01M 10/446 |
| 2021/0328228 A1* | 10/2021 | El-Zahab | ......... | H01M 10/0525 |
| 2022/0200097 A1* | 6/2022 | Lee | .................... | H01M 50/451 |

FOREIGN PATENT DOCUMENTS

| | | | |
|---|---|---|---|
| JP | 2010-182448 A | 8/2010 | |
| JP | 2011-222215 A | 11/2011 | |
| JP | 2013-073846 A | 4/2013 | |
| JP | 2016-007816 A | 1/2016 | |
| JP | 2018-029065 A | 2/2018 | |
| JP | 2019-517722 A | 6/2019 | |
| JP | 2019-537226 A | 12/2019 | |
| WO | 2021/245745 A1 | 12/2021 | |

OTHER PUBLICATIONS

Zhenhua Wang et al., "Dendrite-Free Lithium Metal Anodes in High Performance Lithium-Sulfur Batteries with Bifunctional Carbon Nanofiber Interlayers," *Electrochimica Acta*, 2017, vol. 252, pp. 127-137.

International Search Report for PCT/JP2020/021599 dated Aug. 18, 2020, all pages.

\* cited by examiner

BATTERY AND METHOD FOR PRODUCING SAME

CROSS-REFERENCE TO RELATED APPLICATIONS

This application is a continuation of International Application No. PCT/JP2020/021599, filed Jun. 1, 2020, the entire contents of which are incorporated herein by reference.

TECHNICAL FIELD

The present invention relates to a battery and to a production method for this battery.

BACKGROUND ART

In recent years, techniques for converting natural energy such as solar power or wind power into electric energy have attracted more attention. Accordingly, various solid-state batteries have been developed as storage devices that are safe and that can store a large amount of electric energy.

Among these, secondary batteries that charge and discharge by transferring metal ions between a positive electrode and a negative electrode are known to have a high voltage and high energy density, and are usually lithium ion secondary batteries. In a typical lithium ion secondary battery, an active material capable of retaining lithium is introduced into the positive electrode and the negative electrode, and charging and discharging are performed by exchanging lithium ions between the positive electrode active material and the negative electrode active material. A lithium metal secondary battery has also been developed that does not use an active material in the negative electrode, but retains lithium by depositing lithium metal on the surface of the negative electrode.

For example, Patent Document 1 discloses a high energy density, high power lithium metal anode secondary battery with a volumetric energy density greater than 1000 Wh/L and/or a mass energy density greater than 350 Wh/kg when discharged at room temperature at a rate of at least 1 C. Patent Document 1 discloses that an ultrathin lithium metal anode is used to realize this lithium metal anode secondary battery.

Patent Document 2 discloses a lithium secondary battery containing a positive electrode, a negative electrode, a separation film interposed between the electrodes, and an electrolyte. In the negative electrode of this lithium secondary battery, metal particles are formed on the negative electrode current collector and move from the positive electrode during charging to form lithium metal on the negative electrode current collector in the negative electrode. Patent Document 2 discloses that this lithium secondary battery can solve problems caused by the reactivity of lithium metal and problems that occur during the assembly process, and has improved performance and a longer service life.

CITATION LIST

Patent Literature

Patent Document 1: JP 2019-517722 A
Patent Document 2: JP 2019-537226 A

SUMMARY OF INVENTION

Technical Problem

When the present inventors examined conventional solid-state batteries such as those described in the patent documents listed above, they found that either the energy density or the cycle characteristics were inadequate.

For example, a typical secondary battery that charges and discharges by transferring metal ions between a positive electrode active material and a negative electrode active material does not have sufficient energy density. Meanwhile, in lithium metal secondary batteries that retain lithium by depositing lithium metal on the surface of the negative electrode, such as those described in the patent documents listed above, dendrites tend to form on the surface of the negative electrode after repeated charging and discharging, which makes short-circuiting and reduced capacity more likely to occur. As a result, the cycle characteristics are not sufficient.

A method has also been developed of applying a large amount of physical pressure to a lithium metal secondary battery to keep the interface between the negative electrode and the separator under high pressure and suppress discrete growth during lithium metal precipitation. However, because a large mechanical mechanism is required to apply such a high level of pressure, the weight and volume of the battery increase as a whole, and the energy density decreases.

In view of these problems, it is an object of the present invention to provide a battery having high energy density and excellent cycle characteristics early in the cycle.

Solution to Problem

One aspect of the present invention is a battery comprising: a positive electrode; a negative electrode that is free of a negative electrode active material; a separator that is disposed between the positive electrode and the negative electrode; and a conductive thin film that is disposed between the separator and the negative electrode, wherein the thickness of the conductive thin film is 1 μm or less.

Because potential is applied via the negative electrode and the conductive thin film to the metal layer deposited on the negative electrode surface in the battery according to this aspect of the present invention, the deposited metal layer can be formed and dissolved uniformly. As a result, formation of dendrites on the surface of the negative electrode is suppressed, and this contributes to an improvement in the cycle characteristics. Because the thickness of the conductive thin film in the present invention is 1 μm or less, the increase in the volume of the battery due to the presence of the conductive thin film is suppressed, and the energy density is not lowered.

The conductive thin film can be formed on the separator. In this way, the metal layer deposited on the surface of the negative electrode is formed in the region between the conductive thin film and the negative electrode. As a result, the potential can be made uniform from both sides of the deposited metal layer via the negative electrode and the conductive thin film, and the formation of dendrites is suppressed.

Preferably, the conductive thin film is a thin film composed of carbon, a thin film composed of metal or alloy, or a laminated film thereof. By using these materials for the conductive thin film, the irreversible inclusion of the metal used to form the deposited metal layer into the conductive thin film is suppressed, and the energy density does not decline. Also, when these materials are used, a uniform conductive thin film with a uniform film thickness can be formed even if the film thickness is 1 μm or less. As a result, a conductive thin film effective at suppressing dendrites can be formed.

The battery preferably also has an electrolytic solution in which the separator and the conductive thin film are immersed. Because this electrolytic solution acts as a conductive path for metal ions serving as charge carriers, the internal resistance of the battery is reduced, and this contributes to improvements in the energy density and cycle characteristics.

The battery is preferably a lithium secondary battery in which charging and discharging are performed by depositing lithium metal on the surface of the negative electrode and dissolving the deposited lithium. The present invention has the effect of improving the energy density and cycle characteristics early in the cycle, especially in such a lithium secondary battery.

Another aspect of the present invention is a method for producing a battery, the method comprising the steps of: forming a conductive thin film of 1 μm or less on the separator; and laminating the negative electrode, the separator, and the positive electrode to form a laminate in which the conductive thin film faces the negative electrode. When a conductive thin film having a uniform thickness of 1 μm or less on the separator is formed in the present invention, the formation of dendrites on the surface of the negative electrode is suppressed, and a battery can be produced that contributes to the improvement of the cycle characteristics. Also, because the thickness of the conductive thin film is 1 μm or less, the volume of the battery hardly increases, and the energy density is not reduced. As a result, a battery can be produced that has excellent energy density and cycle characteristics early in the cycle.

A thin film composed of carbon, a thin film composed of metal or alloy, or a laminated film thereof is formed in the step of forming a conductive thin film. By using these materials for the conductive thin film, the irreversible inclusion of the metal used to form the deposited metal layer into the conductive thin film is suppressed, and the energy density does not decline.

The battery production method may further comprise the step of injecting an electrolytic solution into the laminate after the step of forming the laminate. Because this electrolytic solution acts as a conductive path for metal ions serving as charge carriers, the internal resistance of the battery is reduced, and a battery can be produced that contributes to improvements in energy density and cycle characteristics.

Effect of Invention

The present invention is able to provide a battery having high energy density and excellent cycle characteristics early in the cycle.

DESCRIPTION OF EMBODIMENTS

Figure 1:
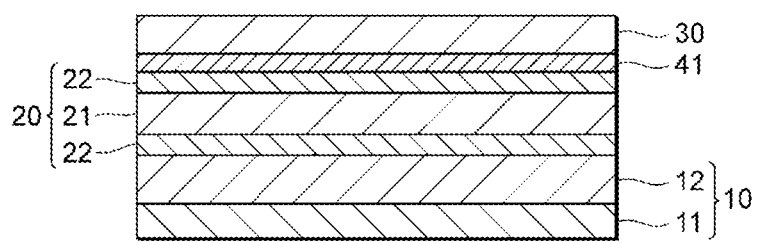
FIG. 1 is a schematic diagram of the battery in an embodiment of the present invention.

An embodiment of the present invention ("the present embodiment" below) will now be described with reference to the drawings when necessary. In the drawings, identical elements are designated by the same reference numbers, and redundant descriptions of these elements has been omitted. Positional relationships such as up, down, left, and right are based on the positional relationship shown in the drawings unless otherwise specified. The dimensional ratios shown in the drawings are not limited to the depicted ratios.

FIG. 1 is a schematic diagram of the battery in the present embodiment. As shown in FIG. 1, the battery 1 in the present embodiment has a positive electrode 10, a negative electrode 30 that is free of a negative electrode active material, a separator 20 that is disposed between the positive electrode 10 and the negative electrode 30, and a conductive thin film 41 that is disposed between the separator 20 and the negative electrode 30.

Positive Electrode

The positive electrode 10 has a positive electrode current collector 11 and a positive electrode active material layer 12 formed on the positive electrode current collector 11.

There are no particular restrictions on the positive electrode current collector 11 as long as it is a conductor that does not react with the metal ions serving as charge carriers in the battery. When the charge carrier metal is lithium, aluminum can used as the positive electrode current collector.

The positive electrode active material layer 12 is a material used to hold metal ions in the positive electrode, and this serves as a host material for the metal ions. The positive electrode active material layer 12 is provided to improve the stability and output voltage of the battery 1.

The positive electrode active material layer 12 contains a positive electrode active material.

Examples of positive electrode active materials include, but are not limited to, metal oxides and metal phosphates. Examples of metal oxides include, but are not limited to, cobalt oxide-based compounds, manganese oxide-based compounds, and nickel oxide-based compounds. Examples of metal phosphates include, but are not limited to, iron phosphate-based compounds and cobalt phosphate-based compounds. When the carrier metal is lithium ions, typical examples of positive electrode active materials include lithium nickel cobalt aluminum oxide (NCA, $LiNiCoAlO_2$), lithium nickel cobalt magnesium oxide ($LiNiCoMnO_2$, referred to as NCM and depending on the difference in element ratio sometimes as NCM622, NCM523, NCM811, etc.), lithium cobaltate (LCO, $LiCoO_2$) and lithium iron phosphate (LFP, $LiFePO_4$) can be mentioned. These positive electrode active materials can be used alone or in combinations of two or more.

The positive electrode active material layer 12 may contain a binder. Examples of binders include fluorine-based binders, water-based binders, and imide-based binders. Specific examples of binders include polyvinylidene fluoride (PvDF), styrene-butadiene rubber and carboxymethyl cellulose (SBR-CMC) mixtures, polyacrylic acid (PAA), lithium polyacrylate (Li-PAA), polyimide (PI), polyamideimide (PAI), and aramids.

The positive electrode active material layer 12 may contain a conductive aid. Examples of conductive aids that can be used include carbon black, carbon nanofibers (VGCF), single-walled carbon nanotubes (SWCNT), and multi-walled carbon nanotubes (MWCNT).

The weight per unit area of the positive electrode active material layer 12 can be, for example, from 10 to 40 mg/cm2. The thickness of the positive electrode active material layer 12 can be, for example, from 30 to 150 μm. The density of the positive electrode active material layer 12 can be, for example, from 2.5 to 4.5 g/ml. The areal capacity of the positive electrode active material layer 12 can be, for example, from 1.0 to 10.0 mAh/cm2.

Negative Electrode

The negative electrode 30 is free of a negative electrode active material and consists of a negative electrode current collector. It can be difficult to increase the energy density of a battery that has a negative electrode including a negative electrode active material because of the presence of the negative electrode active material. However, because the battery 1 in the present embodiment has a negative electrode 30 that is free of a negative electrode active material, this problem does not arise. In other words, the battery 1 in the present embodiment has a high energy density because charging and discharging are performed by depositing metal on the surface of the negative electrode 30 and dissolving the deposited metal.

Here, "negative electrode active material" refers to the material holding the metal ("carrier metal") corresponding to the metal ions serving as the charge carrier in the battery on the negative electrode, and may also be referred to as the carrier metal host material. Examples of holding mechanisms include, but are not limited to, intercalation, alloying, and occlusion of metallic clusters. The capacity of the "negative electrode active material" layer is usually set to the same capacity as that of the positive electrode.

Examples of negative electrode active materials include, but are not limited to, carbon-based substances, metal oxides, metals, and alloys. Carbon-based substances include, but are not limited to, graphene, graphite, hard carbon, mesoporous carbon, carbon nanotubes, and carbon nanohorns. Examples of metal oxides include, but are not limited to, titanium oxide-based compounds, tin oxide-based compounds, and cobalt oxide-based compounds. There are no particular restrictions on the metal or alloy as long as it can be alloyed with the carrier metal. Examples include silicon, germanium, tin, lead, aluminum, gallium, and alloys containing these.

There are no particular restrictions on the negative electrode 30 as long as it does not contain a negative electrode active material and can be used as a current collector. Examples include at least one type selected from the group consisting of metals such as Cu, Ni, Ti, Fe and other metals that do not react with Li, alloys of these metals, and stainless steel (SUS). When SUS is used as the negative electrode 12, any well-known type of SUS can be used. The negative electrode materials mentioned above may be used alone or in combinations of two or more. A "metal that does not react with Li" refers to a metal that does not react with lithium ions or lithium metal to form an alloy under the operating conditions of the battery 1.

The negative electrode 30 is preferably a lithium-free electrode. Because highly flammable lithium metal does not have to be used in the production process, a battery 1 with even better safety and productivity can be realized. From this standpoint and from the standpoint of improving the stability of the negative electrode 30, the negative electrode 30 is preferably at least one type selected from the group consisting of Cu, Ni, alloys of these metals, and stainless steel (SUS). From the same standpoints, the negative electrode 30 is more preferably made of Cu, Ni, or alloys of these metals, and even more preferably of Cu or Ni.

Separator

The separator 20 is the component that separates the positive electrode 10 and the negative electrode 30 to prevent short circuiting, while maintaining conductivity of the metal ions serving as the charge carrier between the positive electrode 10 and the negative electrode 30. It is also a component that does not react with the metal ions. When an electrolytic solution is used, the separator 20 also plays a role in retaining the electrolytic solution. There are no particular restrictions on the separator base material 21 constituting the separator 20 as long as it can play this role, and can be, for example, a porous material such as porous polyethylene (PE), polypropylene (PP), or a laminated structure thereof.

The separator 20 preferably has a separator base material 21 and a separator coating layer 22 coating the surface of the separator base material 21. In the present embodiment, the separator coating layer 22 can be applied to one or both sides of the separator base material 21. The separator coating layer 22 firmly bonds the separator base material 21 to the adjacent layers above and below the base material (the conductive thin film 41 and the positive electrode active material layer 12 in FIG. 1), while maintaining ionic conductivity and without reacting with the metal ions serving as the charge carriers. The separator coating layer 22 may include a binder containing inorganic particles such as silica, alumina, titania, zirconia, magnesium oxide, or magnesium hydroxide.

Conductive Thin Film

The conductive thin film 41 is provided to suppress the formation of dendrites by applying potential to the metal layer deposited on the surface of the negative electrode. The conductive thin film 41 is interposed between the negative electrode 30 and the separator 20. In the present embodiment, the conductive thin film 41 is formed on the separator 20.

The conductive thin film 41 is preferably a thin film made of a metal or an alloy, a thin film made of carbon, or a laminated film thereof. By using these materials for the conductive thin film 41, the irreversible inclusion of the metal used to form the deposited metal layer into the conductive thin film 41 is suppressed, and the energy density does not decline.

There are no particular restrictions on the metals and alloy elements used to form the conductive thin film. When an element that forms an alloy with lithium is used, a metal or alloy that does not form an alloy with lithium or a thin film of carbon is preferably formed as a base on the separator side, followed by a thin film of a metal or alloy that forms an alloy with lithium. Metals and alloys that do not form alloys with lithium include Cu, Ni, Fe, Mn, Ti, Cr, stainless steel, and alloys containing these metals. Metals and alloys that do form alloys with lithium include Si, Sn, Al, In, Zn, Ag, Bi, Pb, Sb, and alloys containing these elements.

A thin film made of carbon is characterized by the use of Sp3 carbon. One example is a diamond-like carbon (DLC) thin film. A thin film made of carbon may be laminated on a thin film made of a metal or an alloy on top of the separator, and may be patterned in-plane.

The overall thickness of the conductive thin film is preferably 1 μm or less. When the thickness of the conductive thin film is 1 μm or less, an increase in battery volume due to the presence of the conductive thin film is suppressed, and the energy density does not decline. The overall thickness of the conductive thin film can be set to, for example, 0.9 μm, 0.8 μm, 0.7 μm, 0.6 μm, 0.5 μm, 0.4 μm, 0.3 μm, 0.2 μm, 0.1 μm (100 nm), 90 nm, 80 nm, 70 nm, 60 nm, 50 nm, 40 nm, 30 nm, 20 nm, 10 nm, 5 nm, or anywhere in between.

Methods that can be used to form the conductive thin film 41 include, but are not limited to, the CVD method, the PVD method, the vacuum deposition method, the sputtering method, the electroless plating method, and the electrolytic plating method.

There is also a method in which a coating film composed of carbonaceous particles and a binder component is formed on the separator in order to make the separator surface conductive. However, this is not a preferred method because the binder component interferes with electrical conductivity, some of the metal in the deposited metal layer is irreversibly incorporated into the coating, and it is difficult to form a uniform coating film with a thickness of 1 μm or less on the separator surface. In the present embodiment, when a thin film made of carbon is used as the conductive thin film 41, it clearly differs from a coating film made of carbonaceous particles and a binder component in that it does not contain a binder component and consists solely of carbon. A thin film made of carbon can be used to achieve low resistance and a uniform film thickness while creating a thinner film than a coating film (carbon coating layer) composed of carbonaceous particles dispersed in a binder component.

Electrolytic Solution

The battery 1 may contain an electrolytic solution. The separator 20 and the conductive thin film 41 are immersed in the electrolytic solution. The electrolytic solution is an ionically conductive solution prepared by dissolving an electrolyte in a solvent that acts as a conductive path for lithium ions. When an electrolytic solution is used, the internal resistance of the battery 1 can be lowered and the energy density and cycle characteristics improved.

A lithium salt is preferably used as the electrolyte. Examples of lithium salts include, but are not limited to, LiPF6, LiBF4, lithium bis(trifluoromethanesulfonyl)imide (LiTFSI), lithium bis(fluorosulfonyl)imide (LiFSI), LiClO4, lithium bisoxalate borate (LiBOB), and lithium bis(pentafluoroethanesulfonyl)imide (LiBETI). The lithium salt is preferably LiFSI from the standpoint of improving the cycle characteristics of the battery 1 even more. These lithium salts may be used alone or in combinations of two or more.

Examples of solvents include, but are not limited to, ethylene carbonate (EC), propylene carbonate (PC), dimethyl carbonate (DMC), 1,2-dimethoxyethane (DME), diethyl carbonate (DEC), γ-butyrolactone (GBL), 1,3-dioxolane (DOL), and fluoroethylene carbonate (FEC).

In the present specification, "suppressing the formation of dendrites on the surface of the negative electrode" means keeping the carrier metal precipitates formed on the surface of the negative electrode from becoming dendrite-like due to repeated charging and discharging of the solid-state battery. In other words, it means inducing carrier metal precipitates formed on the surface of the negative electrode to grow in a non-dendritic form during charging and discharging or repeated charging and discharging of the solid-state battery. Here, the "non-dendrite form" typically means a plate-like form or peak and valley-like form.

Use of the Battery

Figure 2:
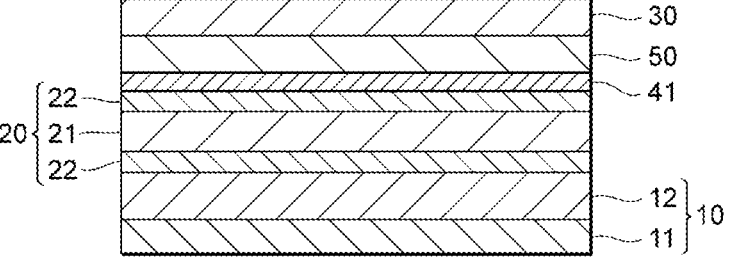
FIG. 2 is a schematic diagram of the battery in the embodiment of the present invention at one point in the charging and discharging cycle.

FIG. 2 is a schematic diagram of the battery in the present embodiment at one point in the charging and discharging cycle. In the battery in the present embodiment, lithium metal is deposited on the negative electrode 30 during charging to form a deposited metal layer 50, and the deposited metal layer 50 on the negative electrode 30 dissolves during discharging. In the battery according in the present embodiment, because the conductive thin film 41 is securely bonded to the separator 20, the deposited metal layer 50 forms between the negative electrode 30 and the separator 41.

In the present embodiment, because uniform potential can be applied from both sides of the deposited metal layer 50 on the surface of the negative electrode 30 via the negative electrode 30 and the conductive thin film 41, the deposited metal film 50 can be deposited uniformly and efficiently dissolved. Therefore, the present embodiment can suppress growth of the deposited metal layer 50 in dendrite form and keep an undissolved inactive deposited metal layer 50 from remaining behind, thus improving the cycle characteristics. Also, because the thickness of the conductive thin film 41 is 1 μm or less in the present embodiment, an increase in battery volume due to the presence of the conductive thin film 41 is suppressed, and the energy density does not decline. Also, the irreversible inclusion of the metal used to form the deposited metal layer into the conductive thin film 41 is suppressed, and the energy density does not decline.

Battery Production Method

The method used to produce the battery in the present embodiment will now be explained with reference to the cross-sectional views in FIG. 3 to FIG. 6.

Figure 3:
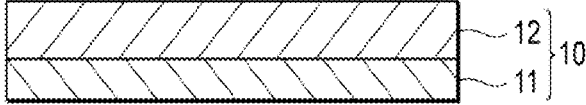
FIG. 3 is a flowchart showing the production steps for the battery in the embodiment of the present invention.

First, the positive electrode 10 is prepared. The positive electrode 10 can be prepared, for example, in the following manner. A positive electrode active material, binder, and, if necessary, conductive aid described above are mixed together to obtain a positive electrode mixture. A mixing ratio of binder to positive electrode active material can be, for example, from 20:80 to 1:99. When the positive electrode mixture contains a conductive aid, the amount added can be, for example, from 0.1 to 5% by mass relative to the mass of the entire mixture. The resulting positive electrode mixture is applied to one side of a positive electrode current collector 11 consisting of, for example, metal foil (for example, Al foil) with a thickness of 5 μm or more and 1 mm or less, and then press-molded to form a positive electrode active material layer 12. The press-molded product is then punched out to obtain a positive electrode 10 with a predetermined size (FIG. 3).

A negative electrode 30 is also prepared. In this step, metal foil of 1 μm or more and 1 mm or less (for example, electrolytic Cu foil) can be washed with a solvent containing sulfamic acid, punched to a predetermined size, washed again ultrasonically with ethanol, and then dried to obtain a negative electrode 30.

Figure 4:
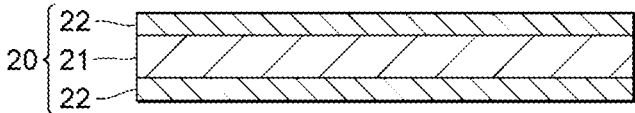
FIG. 4 is a cross-sectional view of a production step for the battery in the embodiment of the present invention.

In the present embodiment, a separator 20 is formed with a conductive thin film 41 before the positive electrode 10 and the negative electrode 30 are laminated. First, as shown in FIG. 4, the separator 20 is prepared. In this step, the binder solution described above is applied to one side of the separator base material 21 and dried to form a separator coating layer 22 on one side, and then the binder solution is applied to the other side of the separator base material 21 and dried to form a separator coating layer 22 on the other side. These coating layers may be formed at the same time.

Figure 5:
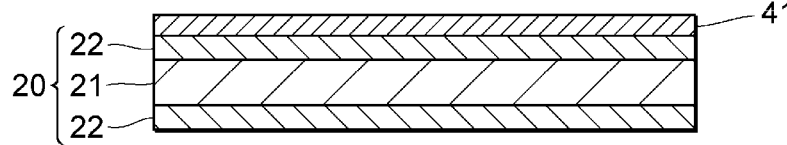
FIG. 5 is a cross-sectional view of a production step for the battery in the embodiment of the present invention.

Next, as shown in FIG. 5, a conductive thin film 41 of 1 μm or less is formed on the separator 20. The conductive thin film 41 can be a thin film made of a metal or alloy, a thin film made of carbon, or a laminated film thereof. The method used to prepare the thin film can be, but is not limited to, the CVD method, the PVD method, the vacuum deposition method, the sputtering method, the electroless plating method, and the electrolytic plating method. By using one of these methods, a conductive thin film 41 with a uniform thickness of 1 μm or less can be formed on the separator 20.

Figure 6:
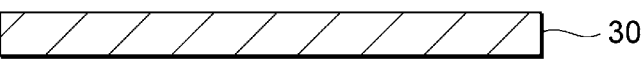
FIG. 6 is a cross-sectional view of a production step for the battery in the embodiment of the present invention.
Figure 6:
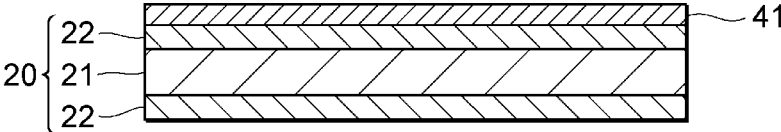
Figure 6:
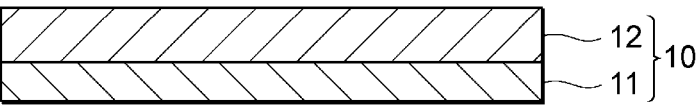

Next, as shown in FIG. 6, the positive electrode 10, the separator 20, and the negative electrode 30 obtained in the manner described above are laminated in this order so that the conductive thin film 41 faces the negative electrode 30.

Next, a metal terminal (for example, Al, Ni, etc.) is joined to both the positive electrode 10 and the negative electrode 30, before inserting the laminate into an outer casing. Any joining method common in the art may be used, such as ultrasonic welding. Next, the battery is completed by injecting an electrolytic solution into the outer casing and sealing the outer casing (FIG. 1).

In the method for producing the battery in the present embodiment, a conductive thin film 41 with a uniform thickness of 1 μm or less can be formed on the separator 20. Because uniform potential can be applied to the deposited metal layer 50, the present embodiment can suppress growth of the deposited metal layer 50 in dendrite form and keep an undissolved inactive deposited metal layer 50 from remaining behind, thus improving the cycle characteristics. Also, because the thickness of the conductive thin film 41 is 1 μm or less in the present embodiment, an increase in battery volume due to the presence of the conductive thin film 41 is suppressed, and the energy density does not decline. Also, the irreversible inclusion of the metal used to form the deposited metal layer into the conductive thin film 41 is suppressed, and the energy density does not decline. As a result, a battery can be produced that has excellent energy density and cycle characteristics early in the cycle.

The embodiment described above is provided merely to explain the present invention and is not intended to limit the present invention to the embodiment. Various modifications are possible without departing from the scope and spirit of the present invention.

EXAMPLES

The following is a more detailed description of the present invention with reference to examples and comparative examples. The present invention is not limited in any way by these examples.

Example 1

Positive Electrode

A NCM622 (LiNi0.6Co0.2Mn0.2O2) positive electrode active material, a PVdF binder, a conductive aid, and a N-methyl-pyrrolidone (NMP) solvent were mixed together to prepare a slurry, which was applied to aluminum foil serving as the positive electrode current collector 11, dried, and pressed.

Separator

A thin film (C) made of carbon with a thickness of 20 nm was formed by sputtering on the surface of a lithium-ion battery grade separator (Sep) using a base material consisting of a polypropylene (PP)/polyethylene (PE)/polypropylene (PP) laminated structure with an overall thickness of approximately 12 μm.

Negative Electrode and Electrolytic Solution

Copper foil was used as the negative electrode. The electrolytic solution was obtained by dissolving 4M LiFSI in DME (dimethoxyethane).

A cell was prepared using one each of the positive electrode, the separator, the negative electrode, and an aluminum laminate as the outer casing, and the cell was sealed and used in the cycle evaluation. The separator was laminated with the conductive thin film facing the negative electrode side to complete the cell. In this way, a battery was prepared in Example 1 with a structure corresponding to the present embodiment.

Examples 2 to 8

In Examples 2 to 5, a battery was prepared in the same manner as Example 1 except that the type of negative electrode and the type and thickness of the conductive thin film on the separator (Sep) were different from those in Example 1. In Examples 2 to 8, sputtering was used to form the thin film. In Example 3, the negative electrode was copper foil having a metal bismuth layer with an average thickness of 100 nm formed on the surface.

Comparative Example 1

In Comparative Example 1, a battery was produced in the same manner as in Example 1 except that a conductive thin film was not formed.

Evaluation of Cycle Characteristics

The cycle characteristics of the batteries produced in each of the examples and comparative examples were evaluated as follows.

Specifically, a flat cell was clipped between metal plates on both sides and charge/discharge cycles were performed. The cell was charged at 4.2 VCC with a current equivalent to 0.1 C and discharged at 3.0 VCC with a current equivalent to 0.1 C, and this charge/discharge cycle test was performed at a temperature of 25° C. Table 1 shows the capacity retention rate of the batteries after 30 cycles.

TABLE 1

| | Negative Electrode | Configuration of Thin Film on Separator | Capacity Retention Rate After 30 Cycles/% |
|---|---|---|---|
| Example 1 | Cu | Sep/C-20 mm | 84 |
| Example 2 | Cu | Sep/Cu-50 nm/C-20 nm | 89 |
| Example 3 | Cu + 100 nm Bi | Sep/C-20 nm | 90 |
| Example 4 | Cu | Sep/Cu-50 nm | 84 |
| Example 5 | Cu | Sep/Cu-50 nm/Sn-20 nm | 86 |
| Example 6 | Cu | Sep/Fe-50 nm | 83 |
| Example 7 | Cu | Sep/Fe-50 nm/C-20 nm | 86 |
| Example 8 | Cu | Sep/Cu-50 nm/Fe-30 nm | 89 |
| Comparative Example 1 | Cu | Sep | 50 |

As shown in Table 1, Examples 1 to 8 had a superior capacity retention rate compared to Comparative Example 1. Specifically, a capacity retention rate of 80% or more after 30 cycles was realized. In Examples 1 to 8, the thickness of the conductive thin film was 100 nm, and the presence of the conductive thin film hardly increased the volume of the battery at all, making it possible to achieve a high energy density.

INDUSTRIAL APPLICABILITY

Because a battery of the present invention has high energy density and excellent cycle characteristics, it has industrial applicability as a power storage device used in various applications.

Other aspects of the invention are set-out as in the following numbered clauses.

1. A battery comprising:
a positive electrode;
a negative electrode that is free of a negative electrode active material;
a separator that is disposed between the positive electrode and the negative electrode; and a conductive thin film that is disposed between the separator and the negative electrode,
wherein the thickness of the conductive thin film is 1 µm or less.

2. The battery according to clause 1, wherein the conductive thin film is formed on the separator.

3. The battery according to clause 1, wherein the conductive thin film is a thin film composed of carbon, a thin film composed of metal or alloy, or a laminated film thereof.

4. The battery according to clause 1, further comprising an electrolytic solution in which the separator and the conductive thin film are immersed.

5. The battery according to clause 1, wherein the battery is a lithium secondary battery in which charging and discharging are performed by depositing lithium metal on the surface of the negative electrode and dissolving the deposited lithium.

6. A method for producing a battery, the method comprising the steps of:
forming a conductive thin film of 1 µm or less on the separator; and
laminating the negative electrode, the separator, and the positive electrode to form a laminate in which the conductive thin film faces the negative electrode.

7. The method for producing a battery according to clause 6, wherein a thin film composed of carbon, a thin film composed of metal or alloy, or a laminated film thereof is formed in the step of forming a conductive thin film.

8. The method for producing a battery according to clause 6, further comprising the step of injecting an electrolytic solution into the laminate after the step of forming the laminate.

REFERENCE SIGNS LIST

1, 2, 3: Battery
10: Positive electrode
11: Positive electrode current collector
12: Positive electrode active material layer
20: Separator
21: Separator base material
22: Separator coating layer
30: Negative electrode
41: Conductive thin film
50: Deposited metal layer

What is claimed is:
1. A battery comprising:
a positive electrode;
a negative electrode that is free of a negative electrode active material;
a separator containing a porous material that is disposed between the positive electrode and the negative electrode;
a conductive thin film that is disposed between the separator and the negative electrode such that the conductive thin film contacts the separator and the conductive thin film contacts the negative electrode,
wherein: the conductive thin film is formed uniformly,
the conductive thin film is composed of: carbon, metal, alloy, or a laminated film thereof, and
the metal or alloy comprises Cu, Ni, Fe, Mn, Ti, Cr, or stainless steel; and
an electrolytic solution, wherein
the thickness of the conductive thin film is 1 µm or less,
the conductive thin film is formed on the separator, and
a deposited metal layer is formed between the conductive thin film and the negative electrode during charging.

2. The battery according to claim 1, wherein the separator is composed of a member that does not react with metal ions.

3. The battery according to claim 1, wherein the separator contains porous polyethylene or polypropylene.

4. The battery according to claim 1, wherein the battery is a lithium secondary battery in which charging and discharging are performed by depositing lithium metal as the metal constituting the deposited metal layer on the surface of the negative electrode and dissolving the deposited lithium.

5. A method for producing a battery, the method comprising the steps of:
forming a uniform conductive thin film of 1 µm or less on a separator containing a porous material, wherein:
the conductive thin film is composed of: carbon, metal, alloy, or a laminated film thereof, and
the metal or alloy comprises Cu, Ni, Fe, Mn, Ti, Cr, or stainless steel; and
laminating a negative electrode, the separator, and a positive electrode to form a laminate in which the conductive thin film faces the negative electrode, wherein:
the negative electrode is free of a negative electrode active material;
the conductive thin film contacts the separator; and
the conductive thin film contacts the negative electrode; and
injecting an electrolytic solution into the laminate, wherein
a deposited metal layer is formed between the conductive thin film and the negative electrode during charging.

6. The method for producing a battery according to claim 5, wherein the separator contains porous polyethylene or polypropylene.

* * * * *